United States Patent [19]

Brice

[11] 4,042,196

[45] Aug. 16, 1977

[54] METHOD AND APPARATUS FOR TRIGGERING A SUBSTANTIAL CHANGE IN EARTH CHARACTERISTICS AND MEASURING EARTH CHANGES

[75] Inventor: Neil M. Brice, McLean, Va.

[73] Assignee: Cornell Research Foundation, Inc., Ithaca, N.Y.

[21] Appl. No.: 164,793

[22] Filed: July 21, 1971

[51] Int. Cl.$^2$ .............................................. B64G 1/10
[52] U.S. Cl. ................................... 244/158; 361/230
[58] Field of Search ................ 244/1, 3.21, 3.22, 136, 244/62, 158; 60/202, 204, 203; 317/4, 262; 239/1, 2, 11, 14, 171; 102/3; 315/111; 250/49.5 R, 106 VC; 210/24; 55/103; 176/1, 5; 324/43 R

[56] References Cited

U.S. PATENT DOCUMENTS

| | | | |
|---|---|---|---|
| 3,095,167 | 6/1963 | Dudley ................................... | 244/62 |
| 3,097,480 | 7/1963 | Sohn ...................................... | 60/202 |
| 3,210,926 | 10/1965 | Forbes et al. ........................... | 60/202 |
| 3,325,123 | 6/1967 | Null ................................... | 244/3.21 X |
| 3,325,123 | 6/1967 | Null ................................... | 244/1 SA X |
| 3,521,835 | 7/1970 | Braga-Illa et al. ................ | 244/1 SA |

Primary Examiner—Trygve M. Blix
Assistant Examiner—Barry L. Kelmachter
Attorney, Agent, or Firm—Jim Zegeer

[57] ABSTRACT

There is disclosed method and apparatus for triggering a substantial change in ionospheric characteristics of the earth and measuring certain selected characteristics of the earth. Substantial energetic particle precipitation is triggered through injection of low energy ionized gas, such as hydrogen, in the region of large fluxes of energetic particles in or near the magnetic equator. The loss process is known to occur naturally but a triggered change is achieved through injection of larger amounts of low-energy ionized gas than are naturally present, preferably in the cusp region, which usually extends inside the synchronous orbit for several hours about local midnight.

4 Claims, 1 Drawing Figure

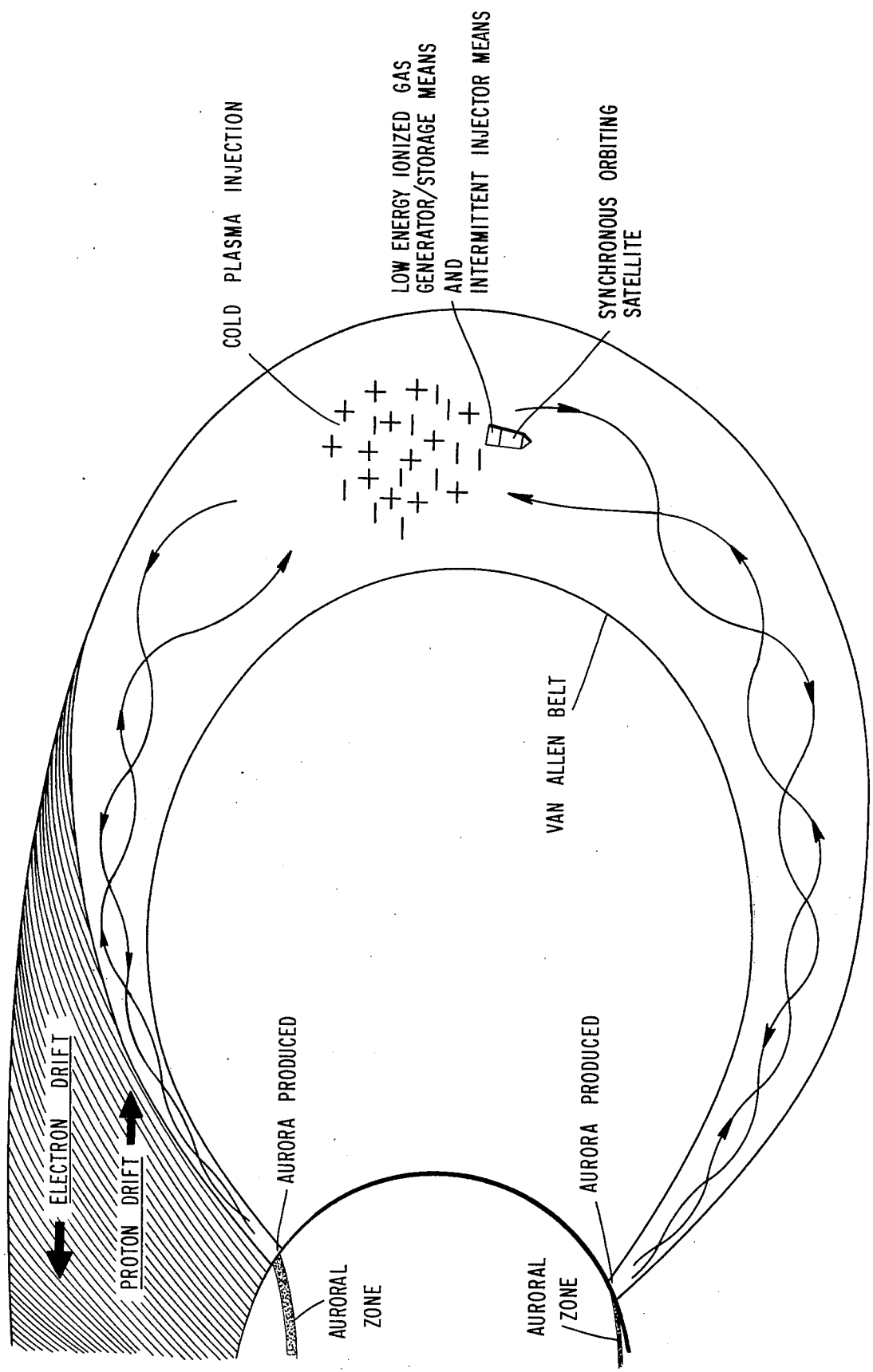

METHOD AND APPARATUS FOR TRIGGERING A SUBSTANTIAL CHANGE IN EARTH CHARACTERISTICS AND MEASURING EARTH CHANGES

The Government has rights in this invention pursuant to Grant Nos. GA 11415 and GA 878 awarded by the National Science Foundation.

I have earlier pointed out that cold plasma (low energy ionized gas) injection from the ionosphere into the magnetosphere could produce enhanced whistler-mode turbulence and associated precipitation of energetic electrons.

Others have recognized that a parallel phenomenon for ion cyclotron waves and protons may arise if the energetic protons diffuse across the plasmapause into the high plasma density region of the magnetosphere. They suggest this as a mechanism for removing the protons responsible for the asymmetric part of the ring current. Still others have suggested that barium clouds released at large distances in the magnetosphere will also increase the cold plasma density and can therefore also produce electron precipitation through enhanced whistler-mode turbulence, possibly creating as a result an "artificial aurora".

Another previous suggestion has been to "turn on" the Northern Lights by heating the ionosphere with radio waves, but high amounts of energy were required and this method has been unsuccessful.

According to this invention in suitable energetic particle distributions, a substantial increase in energetic particle precipitation is achieved by injection of very modest amounts of cold plasma, for example hydrogen. The precipitation arises from an enhancement of the whistler-mode (and ion-cyclotron mode) turbulence resulting from the cold plasma injection. The most favorable initial conditions are a very soft and intense energetic particle distribution with a low density of cold plasma. These conditions are satisfied in the cusp region on the night side of the earth.

The attached drawing shows a partial equatorial section of the earth and the high intensity radiation field trapped therein by the earth's magnetic field.

A detailed description of the way in which an increase in cold plasma density can produce precipitation is set forth in an article entitled "Influence of Magnetospheric Convection And Polar Wind on Loss of Electrons From the Outer Radiation Belt" by Brice and Lucas, appearing in Journal of Geophysical Research, Space Physics Vol. 16, No. 4 Feb. 1, 1971, incorporated herein by reference, and not repeated here. Briefly, the whistler-mode instability will produce precipitation of energetic electrons and under certain conditions will produce a limit in the number of particles that can be stably trapped. This limit applies only to electrons whose energy exceeds some threshold energy, $E_T$, which is comparable with and scales as the magnetic energy density per particle, $B^2/2\mu_0 N$, where $\mu_0$ is the permeability of free space and $N$ is the electron number density. The stable limit is independent of the total number density of particles. Let us now consider a situation in which the threshold energy $E_{T1}$ is greater than the characteristic particle energy. Most of the energetic particles are then not subject to the trapping limit and very high densities can (and do) occur. If the cold plasma density is increased, the threshold energy is reduced from, say, $E_{T1}$ to $E_{T2}$. Electrons with energies between $E_{T1}$ and $E_{T2}$ will then become subject to the trapping limit, and initially high fluxes will be rapidly reduced to this limit (in a few seconds) through pitch angle scattering and precipitation into the atmosphere. This would presumably produce a significant amount of auroral luminosity. One way of practicing the invention is to release, intermittently small amounts of plasma (dribbles or blobs for data gathering purposes) from a synchronous satellite. The optimum initial plasma density would be such that the dominant particles energy was a few times $B^2/2\mu_0 N$, with very steep and intense fluxes as noted above. These conditions are satisfied in the cusp region, which usually extends inside the synchronous orbit for several hours about local midnight.

The initial release and the resulting aurora could provide information about the shape of the field line through the satellite and diffusion of the injected plasma along field lines. If this diffusion is slow, much smaller releases are required as the significant parameter is the electron density, $N$, in and near the equitorial plane.

If the plasma is injected from a synchronous satellite rather than from one which is traveling in orbit through the selected injection region after injection, the plasma would separate from the spacecraft because of the E × B drifts. Intermittent releases would produce a series of blobs, each with an associated patch of aurora. From these patches the drift pattern of the blobs in the magnetosphere would be readily apparent. Diffusion of the blobs across field lines would be observed as extensions of the auroral patches. Changes in density in the blobs would be reflected in changes in the minimum energy of the precipitating electrons.

Qualitatively similar effects would be expected from the ions as a result of increased ion cyclotron turbulence, but the resulting aurora would probably be weaker and more diffuse. Also the loss time for the protons is of the order of an hour so that the ion precipitation into the atmosphere would be less useful as a diagnostic tool.

One further possibility is indicated by the morphology of magnetospheric substorms which strongly suggests that an explosive instability is responsible. It is believed that precipitation into the ionosphere changes to the ionospheric parameters (temperature, density, conductivity, currents, and electric fields), which reflect back into the magnetosphere and cause further precipitation. This shows that if the precipitation is artificially enhanced at an appropriate time, a substorm may result.

REQUIRED PLASMA DENSITIES

Recent measurements in the night side cusp region at the synchronous orbit suggest an almost total absence of cold plasma. To calculate the density required to be injected, assume an initial plasma with characteristic proton and electron energy of 20 and 10 kv, respectively, and a density of 1/cm$^3$ and 6.5$R_E$. This gives a $\beta$ for the plasma of about 1.

If we wish to make the particle parallel energy $E_{11}$ comparable with the parallel threshold energy, we require a plasma number density $N$ such that $$B^2/2\mu_0 NA (A + 1)^2 = E_{11}$$

where A is the ratio of the maximum whistler-mode frequency for which net amplification in the outer magnetosphere occurs to the minimum electron gyrofrequency (A is the critical anisotropy of Kennel and Petcheck. See. J. Geo, Res 71(1), 1-28-66.)

Taking $E_{11}$ equal to one-third of the total electron energy (i.e. about 3 kv) and a value of A of one-third we require an electron density N of 15/cm$^3$ or a flux tube content (assuming protons in diffusive equilibrium) of about 10$^{13}$/cm$^2$ above 1000 km. Thus 1 kg mole would be adequate to fill flux tubes covering an area of 4000 km$^2$ at 1000-km altitude.

The values used for energetic electron energy (10 kv) and the parameter A (;) are perhaps a trifle optimistic, but the dipole value of magnetic is used in the above calculation. Inflation of the flux tubes will decrease the actual magnetic field strength in the equatorial plane and thus reduce the required density of injected plasma.

It has earlier been suggested that enhanced cold plasma densities cause the precipitation in the late morning maximum energetic electron precipitation. Here the increase in density results from flow of plasma up flux tubes from the ionosphere. This results in a noon-midnight asymmetry in threshold energy, with a lower value at noon. A dawn-dusk asymmetry arises from the convective electric fields, and the combination of these effects produces the late morning maximum. Increased ion cyclotron turbulence resulting from high cold plasma densities inside the plasmapause has been suggested by others as a mechanism for the rapid decay of the asymmetric part of the ring current.

By monitoring the results of controlled cold plasma injection in accordance with the invention information on diffusion of plasma along field lines, diffusion across field lines, electric fields deep in the magnetosphere, and magnetic field line shape can be developed. The triggering substorms in accordance with this invention has many potential benefits. Much useful information could be learned about the substorm processes. Triggering substorms would also give a convenient method for (1) providing better predictions for the existence of radar clutter or quality of polar radio-communication circuits, (2) improve safety of astronauts and (3) removal of remanant trapped radiation from very high altitude nuclear tests etc.

While the invention has been particularly shown and described with reference to the preferred embodiment thereof, it will be understood by those skilled in the art that the various changes in form and details may be made therein without departing from the scope and spirit of the invention.

What is claimed is:

1. Apparatus for triggering substantial change in a selected ionospheric characteristic of the earth comprising in combination an earth orbital satellite, a source of low energy ionized gas on said satellite, and means for causing the release of said gas from said satellite at selected time intervals determined by the location of said satellite, when in earth orbit, in a high intensity radiation field trapped by the earth's magnetic field.

2. The invention defined in claim 1 wherein said means for causing release includes means for intermittently releasing said gas in a series of dribbles or blobs.

3. The invention defined in claim 1 wherein said satellite is a synchronous satellite.

4. The invention defined in claim 1 wherein said release is caused to occur at the cusp region on the night side of the earth.

\* \* \* \* \*